Figure 1:
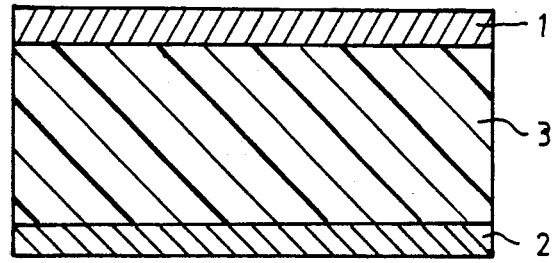

United States Patent [19]

Vates et al.

[11] Patent Number: 4,835,064

[45] Date of Patent: May 30, 1989

[54] CARD OF UNPLASTICIZED PVC FILM

[75] Inventors: Heinz Vates, Fürth-Stadeln; Rainer Edelberg, Ottobrunn, both of Fed. Rep. of Germany

[73] Assignee: Unilever Patent Holdings B.V., Netherlands

[21] Appl. No.: 102,567

[22] Filed: Sep. 29, 1987

[30] Foreign Application Priority Data

Oct. 18, 1986 [DE] Fed. Rep. of Germany ....... 3635526

[51] Int. Cl.$^4$ ............................................ B32B 27/08
[52] U.S. Cl. .................................. 428/518; 428/520; 428/916
[58] Field of Search .................... 428/518, 520, 916

[56] References Cited

U.S. PATENT DOCUMENTS 3,919,447 11/1975 Kilmer, Jr. et al. ................ 428/916

Primary Examiner—P. C. Ives
Attorney, Agent, or Firm—Cushman, Darby & Cushman

[57] ABSTRACT

Card made from a combination of at least two layers of unplasticized PVC film that are bonded together by the application of pressure. At least one layer of a flexible plastic is incorporated in this combination. This layer of flexible plastic consists preferably of PVC modified with acrylate VC copolymers.

2 Claims, 1 Drawing Sheet

CARD OF UNPLASTICIZED PVC FILM

BACKGROUND OF THE INVENTION

The invention relates to a card made from a combination of at least two layers of unplasticized PVC film that are bonded together by the application of pressure.

Cards of this kind are in use as identity and cheque cards. The different layers they incorporate are necessary in order to make the cards highly forgery-proof. Unplasticized PVC film has proved to be a very advantageous material for the individual layers because of its resistance. However, if several such layers of film are bonded together by pressure application, which is necessary to make them forgery-proof, the whole of the card often breaks if it is subjected to even minimal mechanical stresses, particularly at low temperatures.

SUMMARY OF THE INVENTION

The purpose of the invention is to create a card of the kind outlined above, with the same good properties but without the problem of breakage.

The way the invention achieves this purpose is by incorporating at least one layer of a flexible plastic in the combination used to make the card.

It has surprisingly turned out that this flexible layer eliminates tensions which are evident within the combination when there is no such flexible layer, even if only one such layer is located between more than two layers made of unplasticized PVC film.

It has, however, proved to be particularly effective if in accordance with this invention each unplasticized PVC layer is followed by a layer of flexible material, with both the outside layers of the combination consisting of unplasticized PVC.

Such a structure provides the cards with an optimum of strength and flexibility, which has proved to have a very positive effect on the useful life of the cards.

A particularly advantageous embodiment of the invention is achieved when the flexible material is a film made from PVC modified with acrylate VC copolymers. This film has no adverse effect at all on the stiffness of the card, but the card is nevertheless flexible enough to prevent breakage.

BRIEF DESCRIPTION OF THE INVENTION

The drawings show four embodiments of the invention. FIGS. 1-4 show four different structures of card combinations.

DETAILED DESCRIPTION OF THE INVENTION 1 and 2 in FIG. 1 are two unplasticized PVC film outer layers of an identity card not illustrated in any further detail. Layer 3, which consists of PVC modified with acrylate VC copolymers is sandwiched between these two outer layers. The two outer layers 1 and 2 are relatively thin (about 80 micrometers), while the inner layer 3 is relatively thick (600 micrometers).

Figure 2:
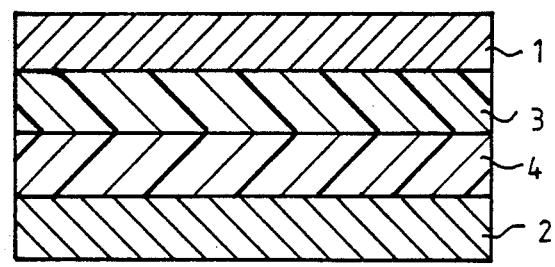

The card combination shown in FIG. 2 also has two outer layers 1 and 2 made of unplasticized PVC film as well as two layers 3 and 4 located between them, both of which are made from PVC modified with acrylate VC copolymers, the acrylate share of which may, however, differ.

Figure 3:
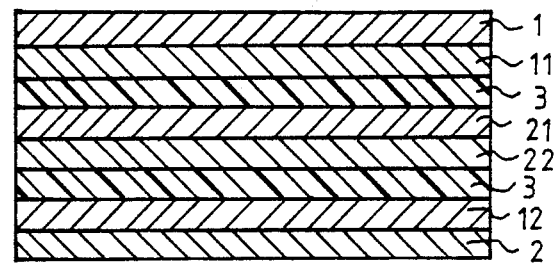

In the embodiment shown in FIG. 3 the two outer layers 1 and 2 are each pressure bonded to a layer 11/12 which is also made from unplasticized PVC. A layer 3 made from flexible PVC modified with acrylate VC copolymers is provided on the inside of each of these two layers. Two layers 21 and 22 made of unplasticized PVC are then incorporated as the middle two layers of this card combination.

Figure 4:
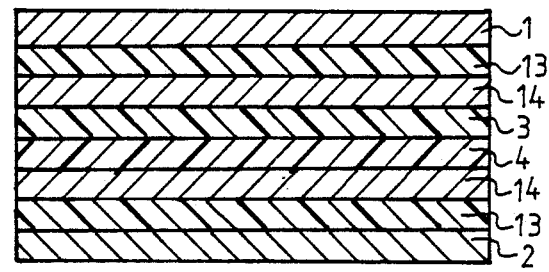

In the embodiment shown in FIG. 4 a flexible layer 13 is applied as a lacquer film to the inside of outer layer 1. A layer 14 of unplasticized PVC is then provided, which is in turn bonded to a layer 3 made from PVC modified with acrylate VC copolymers. The structure on the other side, starting from outer layer 2, which is also made from unplasticized PVC, is identical, except that the inside layer 4 made from PVC modified with acrylate VC copolymers has a different acrylate share than layer 3.

What is claimed is:

1. A card made from a combination of at least two other layers of unplasticized PVC film and an intermediate layer which is a film made from PVC modified with acrylate vinyl chloride copolymers and wherein said layers are bonded together by the application of pressure.

2. The card as claimed in claim 1, wherein both of said outside layers of the combination consist of unplasticized PVC.

* * * * *